United States Patent [19]

Schoening et al.

[11] Patent Number: 4,661,311
[45] Date of Patent: Apr. 28, 1987

[54] NUCLEAR POWER PLANT ARRANGED IN AN UNDERGROUND CAVITY WITH A SMALL HIGH-TEMPERATURE PEBBLE BED REACTOR

[75] Inventors: Josef Schoening, Hambruecken; Fritz Schmiedel, Ketsch; Peter Hobrecker, Heidelberg; Helmut Winkenbach, Viernheim, all of Fed. Rep. of Germany

[73] Assignee: Hochtemperatur-Reaktorbau GmbH, Fed. Rep. of Germany

[21] Appl. No.: 699,263

[22] Filed: Feb. 7, 1985

[30] Foreign Application Priority Data

Feb. 9, 1984 [DE] Fed. Rep. of Germany ....... 3404572

[51] Int. Cl.⁴ .................. G21C 19/28; G21C 19/00
[52] U.S. Cl. ................................ 376/266; 376/273; 376/381
[58] Field of Search .............. 376/257, 265, 266, 273, 376/337, 338, 381, 383, 458

[56] References Cited

U.S. PATENT DOCUMENTS 3,755,079  8/1973  Weinstein et al. ................. 376/273

FOREIGN PATENT DOCUMENTS

| 6753677 | 7/1963 | Fed. Rep. of Germany . |
| 1281046 | 10/1968 | Fed. Rep. of Germany ...... 376/266 |
| 2357426 | 11/1973 | Fed. Rep. of Germany . |
| 1589532 | 9/1976 | Fed. Rep. of Germany . |
| 2531307 | 1/1977 | Fed. Rep. of Germany ...... 376/266 |
| 2621358 | 11/1977 | Fed. Rep. of Germany ...... 376/257 |
| 3335451 | 4/1985 | Fed. Rep. of Germany . |
| 3345113 | 6/1985 | Fed. Rep. of Germany . |
| 1239304 | 7/1971 | United Kingdom . |

Primary Examiner—Deborah L. Kyle
Assistant Examiner—Richard L. Klein
Attorney, Agent, or Firm—Robert J. Koch

[57] ABSTRACT

The invention concerns a nuclear power plant located in an underground cavity, with a small high-temperature reactor which, together with a heat exchanger apparatus, is housed in a steel reactor pressure vessel. The reactor core comprises spherical operating elements which pass through the reactor several times. In order to provide unimpaired access to the components of the primary loop from above, the loading installation of the small high-temperature reactor is designed in a specific manner. It comprises a section located in a loading space under the reactor pressure vessel including a discharge device and a conveyor device. An addition device for fresh operating elements and a collector vessel for used operating elements are arranged either outside the underground cavity or, in the alternative, in the loading space. For the insertion of the fresh operating elements into the core the conveyor device is equipped with an inward transfer block, by means of which the operating elements and the partially depleted operating elements are fed into a vertical ascending line. The ascending line is connected with a distributor device for the reactor core located over the core, outside and to the side of the reactor pressure vessel.

9 Claims, 1 Drawing Figure

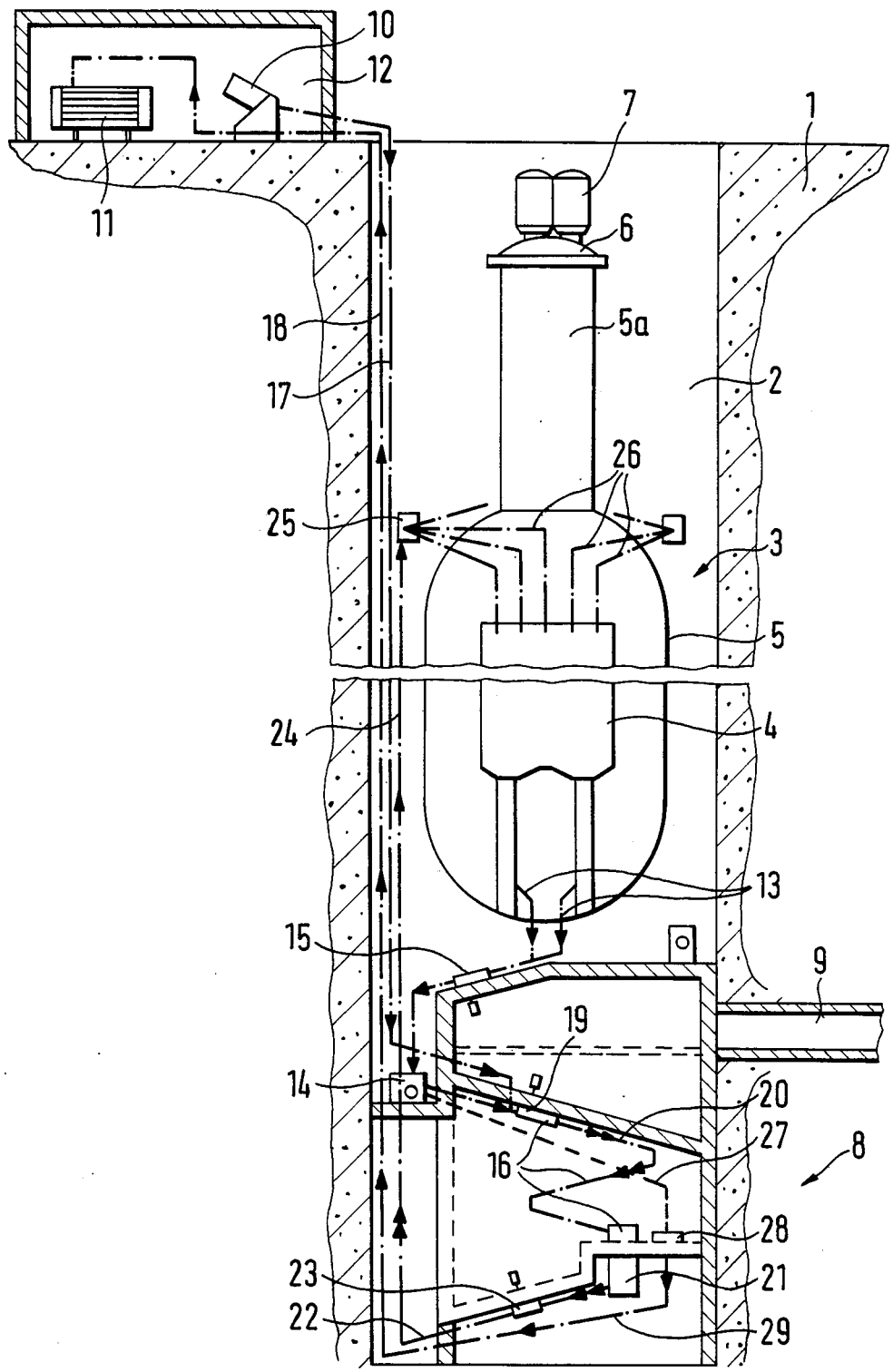

NUCLEAR POWER PLANT ARRANGED IN AN UNDERGROUND CAVITY WITH A SMALL HIGH-TEMPERATURE PEBBLE BED REACTOR

BACKGROUND OF THE INVENTION

The invention concerns a nuclear power plant arranged in an underground cavity comprising a small high-temperature pebble bed reactor; a reactor core; spherical operational elements which pass through the core more than once; a steel reactor pressure vessel in which the small high-temperature reactor and a heat exchange apparatus are installed; and a loading installation for the addition and removal of fuel elements.

A nuclear powe plant of this type is described in German patent application No. P 33 35 451.0. In this nuclear power plant, all of the components of the primary loop, together with the control and shutdown installations are disposed within a steel reactor pressure vessel in such a manner that they may be installed and removed from above. This renders an economical underground construction possible. Under the small reactor, at least one discharge tube is provided for the removal of the spherical fuel elements.

Another nuclear power plant with a small high-temperature reactor suitable for installation in an underground cavity is described in German patent application No. P 33 45 113.3. Here again, the spherical fuel elements introduced on top are drawn off by means of a discharge device at the bottom of the pile.

Loading installations for nuclear reactors of medium capacity with spherical fuel elements which are built by the principle of modular construction are known. These installations comprise movable functional parts for the addition, removal, distribution and extraction of fuel elements by means of drives. The functional parts are provided with bores for the passage of fuel elements and are set into a block, or plate equipped with connecting bores for the fuel elements. Feed installations of this type are described in German Gebrauchsmuster No. 6 753 677, German Auslegeschrift No. 15 89 532 and German Offenlegungsschrift No. 23 57 426. The manner in which the introduction of the fuel elements into the reactor core is effected, is not disclosed in the references cited.

The state of the art further includes German Pat. No. 1 281 046, which again concerns the feed installation of a so-called pebble bed reactor of intermediate capacity. The discharge and sorting installation for the spherical fuel elements is located under the reactor core. It contains a measuring device in which the fuel elements are examined with regard to their state of depletion. Depending on the results of the measurement, the fuel elements are either returned into the reactor core or eliminated from the circulation of fuel elements. The addition of fresh fuel elements is effected from above through a feed tube. The installation and removal of primary loop components is thus rendered difficult.

SUMMARY OF THE INVENTION

It is an object of the present invention to design the feed installation for the small high-temperature pebble bed reactor in a nuclear power plant of the aforedescribed structural type, so that access to the components of the primary loop from above is not impaired, and so that the loading installation occupies as little space as possible.

According to the present invention, this and other advantageous objects are attained by providing a divided loading space under the reactor pressure vessel. A discharge installation comprising removal, depletion and sorting devices is located in the loading space, together with a conveyor installation. An addition device for fresh fuel elements and a collector vessel for used fuel elements are arranged outside the underground cavity, and are connected with the lower part of the loading space by means of vertical conduits, mounted outside the reactor pressure vessel. The conveyor installation comprises an inward transfer block for transferring fresh fuel elements from the addition device as well as partially depleted fuel elements sorted out in the depletion measuring installation. The conveyor installation is connected with a distribution installation for the reactor core by a vertical ascending line located above the reactor core, outside and to the side of the reactor pressure vessel. The depletion measuring installation is connected with an outward transfer block for depleted fuel elements by means of another line which is in turn connected with the vertical conduit of the collector vessel.

In the nuclear power plant according to the invention, fresh fuel elements are therefore not added directly into the reactor core from above, but are conveyed outside the reactor pressure vessel into the lower part of the loading installation and transported to the distribution device in the same line with the partially depleted fuel elements. From there they are fed laterally into the reactor pressure vessel. Unimpaired access to the primary loop components from above is thus provided.

According to a further embodiment of the invention, a column of fuel elements is always present in the conduit in order to prevent damage by impact to the fresh fuel elements in the course of their transport through the vertical conduit. The great fall height thus cannot have a harmful effect on the fuel elements, even in the absence of braking means.

The aforedescribed objects of the invention may also be attained with a configuration different from the one described above. One alternative configuration according to the present invention is characterized in that a divided loading space is provided under the reactor pressure vessel; an addition device for fresh fuel elements and a collector vessel for used fuel elements are disposed in the loading space, together with a discharge installation comprising removal, depletion measuring and sorting devices and a conveyor device; the loading space is accessible through a horizontal channel and a vertical shaft; the conveyor installation comprises an inward transfer block for the introduction of fresh fuel elements from the addition device, together with partially depleted fuel elements sorted out in the depletion measuring device; the conveyor installation is connected with a distribution device for the reactor core by means of a vertical ascending line; the distribution device is provided above the reactor core, outside and to the side of the reactor pressure vessel; the depletion measuring device is connected by another line with an outward transfer block for depleted fuel elements, which, in turn, is connected with the collector vessel by a further line.

The operating elements of a small high-temperature pebble bed reactor with a capacity of 100 to 200 MWe comprises one-half fuel elements and one-half pure graphite elements, or so-called blind elements. The above is true if one disregards the initial loading phase in which absorber elements are also added. As the consumption of the graphite elements cannot be measured with the depletion measuring installation, it is proposed to completely replace the graphite elements with fresh graphite elements in the course of the operational recirculation of the core load after an operating period of (n−1) years in order to avoid greater expense. The symbol n is defined as the service life of the graphite elements in years. Under the conditions prevailing in a small reactor n amounts to about 10 years. With this method, even though the quantity of fresh graphite elements is twice as high as that actually consumed, there is still a cost saving.

BRIEF DESCRIPTION OF THE DRAWINGS

The drawing shows a schematic longitudinal section of an embodiment of a nuclear power plant according to the present invention (parts not essential to the invention are not shown).

DETAILED DESCRIPTION OF THE PREFERRED EMBODIMENT

A cavity 2 is excavated in the ground 1 and a nuclear power plant 3 is arranged therein. The nuclear power plant comprises a small high-temperature reactor 4 with a capacity of 100 MWe and a steam generator (not shown). The steam generator and the small reactor 4 are installed in a steel reactor pressure vessel 5. The reactor pressure vessel 5 has a cylindrical cross section and is narrowed in its upper part 5a which houses the steam generator. Two circulating blowers 7 for cooling gas are set on a vaulted cover 6 of the part 5a.

The core of the small high-temperature reactor is formed of spherical operating elements (fuel and pure graphite elements), which pass through the core several times. A loading space 8 divided into several chambers is provided under the reactor pressure vessel. This loading space is followed laterally by a horizontal channel 9 which is connected with a vertical shaft (not shown).

The addition and removal of the operating elements is effected by means of a loading installation comprising an upper and a lower part.

The upper part further comprises an addition device 10 for fresh operating elements and a collector vessel 11 for used operating elements, both of which are housed in a shielded building 12 located on the surface of the ground adjacent to the cavity 2.

The lower part further comprises a discharge device including a removal device 13, a depletion measuring device 14 and a sorting device 15. These devices are installed in the loading space 8, i.e., under the reactor pressure vessel 5. Secondly, the lower part of the loading installation comprises a conveyor device 16 which is also housed in the chambers of the loading space 8.

The discharge device 13 comprises two operating element discharge tubes, each equipped with a decollator. Sphere fragments and scraps are sorted out in the sorting installation 15. The state of depletion of the operating elements is determined in the depletion measuring device 14. The depletion measuring device decidees whether the operating elements are removed from the circulation or returned to the reactor core.

A vertical conduit 17 and 18 leads from both the addition device 10 and the collector vessel 11 along the outside of the reactor pressure vessel 5 to the lower part of the loading installation.

The vertical conduit 17 connects the addition device 10 with an inward transfer block 19 which is part of the conveyor device 16. The inward transfer block 19 is also connected to a line 20 coming from the depletion measuring device 14. Operating elements that are still usable may also be fed into the conveyor device 16 through line 20.

A conveyor block 21 transports all of the operating elements fed in through a conduit 22 and a decollator 23 to a vertical ascending conduit 24. The operating elements are thus conveyed upwards and introduced into a distributor device 25. The latter is located over the reactor core, outside the reactor pressure vessel 5, and in the area of transition to the narrowed part 5a. The distributor device 25 effects the insertion of the operating elements into the reactor core by means of the lines 26.

In order to prevent mechanical damage to the fresh operating elements in the course of their conveyance through the vertical conduit 17, a column of operating elements is always present in the conduit.

Operating elements determined not to be reusable in the depletion measuring device 14 pass through a line 27 into an outward transfer block 28, from whence they are transported through a conduit 29 to the vertical conduit 18. They are then conveyed upward to the collector vessel 11.

What is claimed is:
1. A nuclear power plant comprising:
a reactor pressure vessel positioned in an underground cavity;
a small high-temperature pebble bed reactor disposed within the reactor pressure vessel and having spherical operating elements passing through a reactor core;
means for addition, removal, and circulation of operating elements associated with said reactor including:
means for discharging said operating elements from said core, depletion measuring means for separating depleted operating elements based on degree of depletion, and means for sorting and removal of operating element fragments, located under the reactor in a divided loading space;
means for conveying operating elements to said reactor core including an insertion block means for inward transfer of operating elements located in said divided loading space and connected to said depletion measuring means for sorting;
means for adding fresh operating elements located outside of said cavity and connected to said insertion block means;
means for distributing said operating elements to said reactor core, disposed laterally outside said pressure vessel above said reactor core; and
a first conduit connecting the insertion block means with the means for distributing.
2. A nuclear power plant as recited in claim 1 further comprising:
an extraction block means for outwardly transferring used operating elements;
a second conduit connecting the depletion measuring means with the extraction block means;
a collector vessel disposed outside of the underground cavity;
a third conduit connecting the extraction block means with the collector vessel;
a fourth conduit connecting the means for adding and the means for conveying.

3. A nuclear power plant as recited in claim 2, wherein a column of operating elements is always present in said fourth conduit.

4. A nuclear reactor as recited in claim 2, wherein said operating elements comprise one-half spherical fuel elements and one-half spherical graphite elements.

5. A nuclear power plant according to claim 4, wherein said means for addition, removal and circulation of said operating elements further fully replaces said graphite elements with fresh elements during operation of the reactor after a period of "n−1" years, where "n" is the service life of the graphite elements in years.

6. A nuclear power plant with a small high-temperature pebble bed reactor disposed in an underground cavity, comprising:
  (a) a reactor pressure vessel;
  (b) a small high-temperature pebble bed reactor disposed within the reactor pressure vessel and having a core including spherical operating elements for passing through the core several times;
  (c) a heat exchanging apparatus disposed within the reactor pressure vessel;
  (d) a divided loading space;
  (e) means disposed in the divided loading space for adding fresh operating elements to said reactor;
  (f) a collector vessel for collecting used operating elements, disposed in the divided loading space;
  (g) a horizontal conduit for gaining access to the divided loading space;
  (h) a vertical shaft for gaining access to the divided loading space;
  (i) means disposed within the divided loading space for removal of operating elements, said means including a discharge device, a depletion measuring device for separating depleted operating elements based on degree of depletion, and a means for sorting and removal of element fragments; and
  (j) means disposed within the divided loading space for conveying operating elements, said means including an inward transfer of fresh operating elements from the addition device and the inward transfer of partially depleted operating elements from the depletion measuring device.

7. A nuclear power plant as recited in claim 6 further comprising:
  (a) a distributor for distributing the operating elements, disposed above the reactor core, outside and to the side of the reactor pressure vessel;
  (b) a first coonduit connecting the inward transfer block with the distributor;
  (c) an outwad transfer block for outwardly transferring used operating elements;
  (d) a second conduit connecting the depletion measuring device with the outward transfer block;
  (e) a third conduit connecting the outward transfer block with the collector vessel.

8. A nuclear reactor as recited in claim 7, wherein said operating elements comprise one-half spherical fuel elements and one-half spherical graphite elements.

9. A nuclear power plant according to claim 8, wherein said means for adding fresh operating elements and means for removal of operating elements further fully replaces said graphite elements with fresh elements during operation of the reactor after a period of "n−1" years, where "n" is the service life of the graphite elements in years.

* * * * *